United States Patent
Röhm

(10) Patent No.: US 6,648,563 B2
(45) Date of Patent: Nov. 18, 2003

(54) QUICK-CHANGE DRILL CHUCK

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 10/016,888

(22) Filed: Dec. 14, 2001

(65) Prior Publication Data

US 2003/0077136 A1 Apr. 24, 2003

(30) Foreign Application Priority Data

Oct. 23, 2001 (DE) .......................... 101 51 581

(51) Int. Cl.⁷ .................. B23B 31/02; B23B 51/14; B23G 1/46
(52) U.S. Cl. .................. 408/239 R
(58) Field of Search .................. 408/239 R, 239 A, 408/240; 279/22, 29, 30, 74, 75, 60–65, 904, 905, 143–145, 155

(56) References Cited

U.S. PATENT DOCUMENTS 4,621,820 A * 11/1986 Rohm ..................... 279/62
5,180,261 A * 1/1993 Schreiber ................ 408/239 R
5,199,833 A * 4/1993 Fehrle et al. ........... 408/239 R
5,437,465 A * 8/1995 Vogele et al. ................ 279/22
5,603,516 A * 2/1997 Neumaier ................... 279/75
5,951,026 A * 9/1999 Harman, Jr. et al. ........ 279/143
5,957,634 A * 9/1999 Carpinetti ................ 279/143
6,241,026 B1 * 6/2001 Wache et al. ............... 279/75
6,457,916 B2 * 10/2002 Wienhold .................. 408/240

* cited by examiner

Primary Examiner—Steven C. Bishop
(74) Attorney, Agent, or Firm—Herbert Dubno; Andrew Wilford

(57) ABSTRACT

A drive spindle is formed with an axially forwardly open socket of noncircular section and with at least one radially throughgoing passage open radially inward into the socket. A chuck body has a stem of noncircular section complementary to that of the socket and formed with a radially outwardly open recess. A locking element is radially displaceable in the passage between an inner position projecting radially inward into the socket and an outer position clear of the socket and projecting radially outward from the spindle. The stem is fittable to the socket with its recess aligned with the passage. A collar is formed with an inner surface closely juxtaposed with an outside surface of the spindle and with a radially inwardly open recess.

15 Claims, 8 Drawing Sheets

QUICK-CHANGE DRILL CHUCK

FIELD OF THE INVENTION

The present invention relates to a drill. More particularly this invention concerns a chuck for a drill.

BACKGROUND OF THE INVENTION

A standard drill chuck comprises a chuck body centered on and rotatable about an axis and formed with a plurality of angled guides spaced about the axis and each holding a respective jaw. Rear edges of the jaws have rows of teeth meshing with an internal screwthread of a tightening sleeve that can be rotated in one direction to advance the jaws axially and bring them together radially so as to grip a tool and in the opposite direction to separate the jaws and release the tool. Means may be provided to lock the tightening sleeve to prevent unwanted loosening of the chuck.

As a rule the chuck body is formed with an axially rearwardly open threaded bore into which fits an externally threaded spindle of a drive unit. The two parts are screwed together under substantial torque so that the chuck stays solidly mounted even under the considerable angular forces that it is subjected to in normal use. Frequently a radial set screw is fitted to the body and engages the spindle to angularly lock the parts together even more solidly.

Thus it is in theory possible to remove and replace the chuck, but this operation often is extremely difficult since over time the chuck body and drill spindle become frozen together. Thus changing a standard chuck as describe above with, for instance, a collet chuck or some sort of special-duty chuck is not practical, and normally not something easily carried out in the field.

OBJECTS OF THE INVENTION

It is therefore an object of the present invention to provide an improved drill chuck.

Another object is the provision of such an improved drill chuck which overcomes the above-given disadvantages, that is which can easily be removed from and replaced on a drill spindle.

SUMMARY OF THE INVENTION

A drill has according to the invention a drive spindle centered on and rotatable about a spindle axis and formed centered on the axis with an axially forwardly open socket of noncircular section and with at least one radially throughgoing passage open radially inward into the socket. A chuck body has a stem of noncircular section complementary to that of the socket, fixed to the chuck body, and extending along a stem axis from the chuck body. The stem is formed with a radially outwardly open recess. A locking element is radially displaceable in the passage between an inner position projecting radially inward into the socket and an outer position clear of the socket and projecting radially outward from the spindle. The stem is fittable to the socket with its recess aligned with the passage. A collar is formed with an inner surface closely juxtaposed with an outside surface of the spindle and with a radially inwardly open recess. The collar is axially displaceable on the spindle between a locked position with its inner surface pressing the element into the inner position and an unlocked position with its recess level with the element and the element movable into the outer position engaged in the collar recess.

Thus with this system simply shifting the collar in to the unlocked position allows the chuck to be taken off the spindle. The chuck can be changed, for instance a three-jaw chuck can be swapped with a collet chuck or a hex chuck. The changeover is simple so it can be done easily in the field. Nonetheless the mounted chuck is axially and rotationally solidly fixed on the drill spindle. In addition it is possible to use several different chucks for tools of different diameters on the same drill unit, for instance a half-inch and quarter-inch chuck can both be used.

The chuck body according to the invention is formed with a rotation-symmetrical surface portion and the spindle is formed with a complementary surface portion that snugly engages the surface portion of the body when the stem is fitted in the socket. In this case the chuck-body surface portion is a cylindrical inner surface centered on the stem axis and the spindle surface portion is a cylindrical outer surface centered on the spindle axis. Alternately the socket is formed with a rotation-symmetrical surface portion centered on the spindle axis and the stem is formed with a complementary surface portion that snugly engages the surface portion of the socket when the stem is fitted in the socket. Here the socket surface portion is a cylindrical inner surface centered on the spindle axis and the stem surface portion is a cylindrical outer surface centered on the stem axis. In both systems the chuck body is thus accurately centered on the drill spindle so that the tool or workpiece held by the chuck will be rotated accurately about the spindle axis.

In addition in accordance with the invention the spindle and chuck body are formed with respective axially engageable planar faces respectively perpendicular to the spindle and stem axes. More particularly the spindle has an outer end formed with the respective planar face or the stem has an outer end formed with the respective planar face and the socket has a floor formed with the planar face of the spindle. In this manner axial forces are also transmitted from the spindle to the chuck body.

The stem and socket are of polygonal section, normally hexagonal. This ensures excellent transmission of torque from the spindle to the chuck. Furthermore when the hex socket conforms to the standard hex drive size it is possible to directly chuck hex-shaft tools in the drill spindle, without using a chuck.

For most secure axial holding of the chuck on the spindle, the spindle is formed with a plurality of the passages each receiving a respective one of the locking elements and the recess of the stem is a radially outwardly open groove. The locking elements are balls. Thus there are several locations at which the spindle is secured to the chuck-body stem.

To prevent inadvertent disconnection of the chuck from the drill unit, a spring is braced between the spindle and the collar urging the collar into the locked position. Normally the locked position is axially forward of the unlocked position so the collar has to be pulled back to free the chuck.

The chuck body according to the invention is formed with a plurality of angled axially forwardly open guides each receiving a respective jaw. A tightening ring rotatable on the body has a screwthread meshing with the jaws.

To facilitate removal of the chuck a knockout rod is axially displaceable in the spindle and axially engageable with the stem. A spring urges the knockout rod outward against the stem. In this arrangement a second locking element is radially engageable with the knockout rod and with the collar. The second locking element is movable out of engagement with the knockout rod on displacement of the collar into the unlocked position. More particularly the spindle is formed with a second radially extending passage level with the knockout rod and holding the second locking element. The knockout rod is formed with a radially outwardly open recess in which the second element is radially engageable in the locked position of the collar. Thus pulling back the collar simultaneously frees the chuck-body stem and the knockout rod, causing the chuck to be ejected from the spindle.

To allow retrofit of the system of this invention to an existing drill unit with a threaded spindle, an outer port forming the socket is threaded to an inner part fixed on the drill unit.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
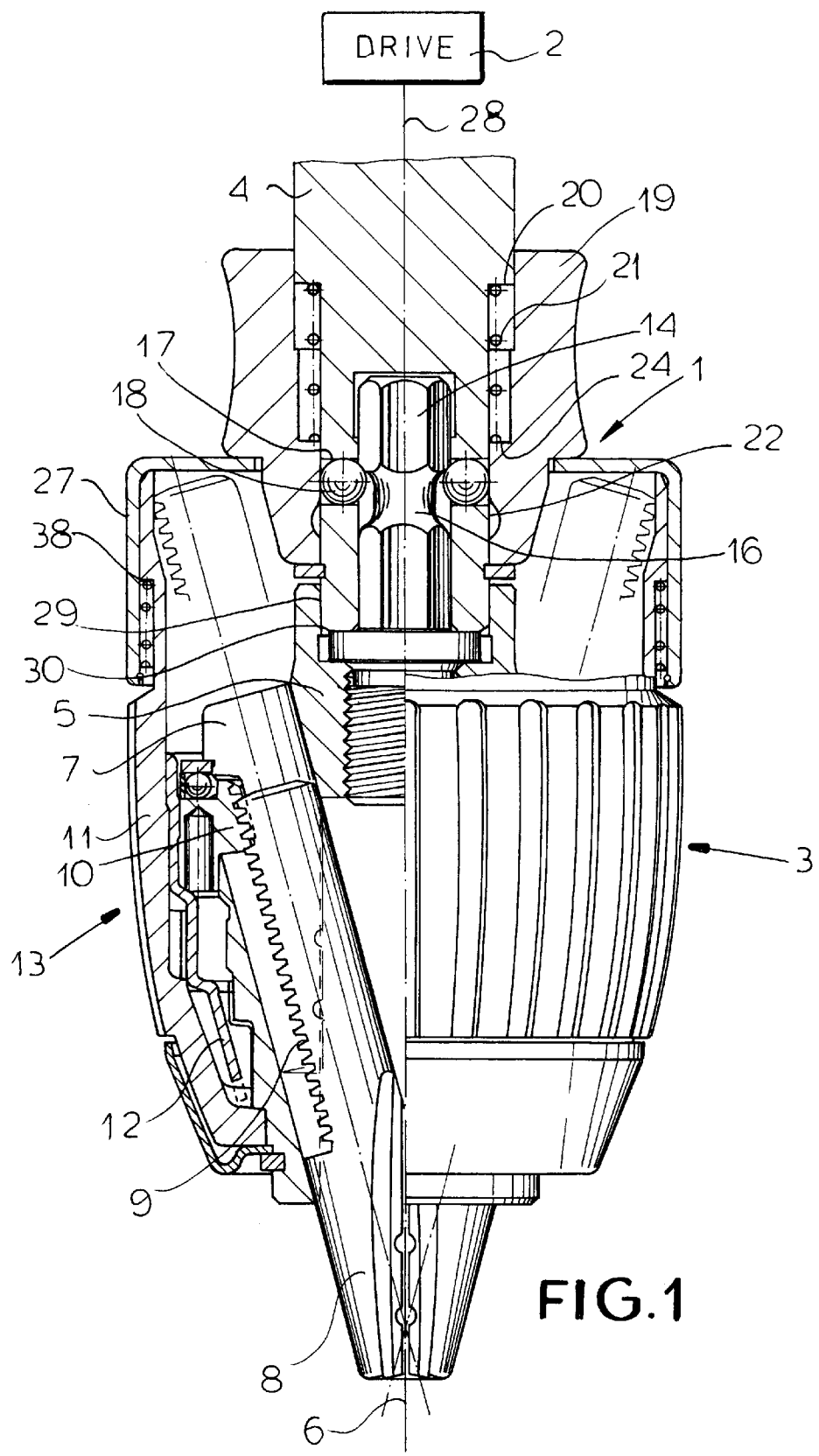
FIGS. 1 and 2 are side views partly in axial section through a chuck according to the invention in mounted and unmounted condition.
Figure 2:
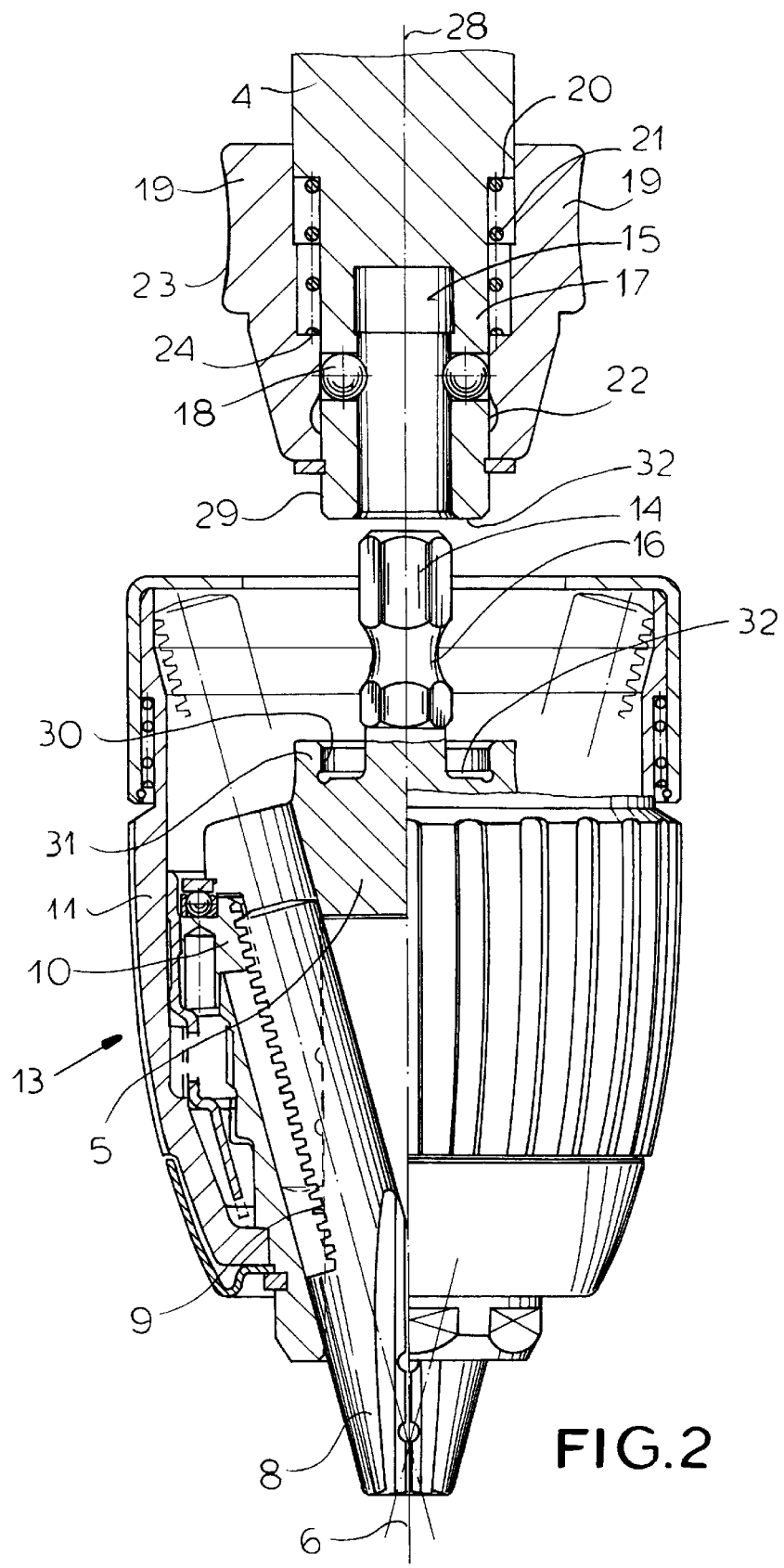

As seen in FIGS. 1 and 2 a drill 1 comprises a chuck 3 and a drive unit 2. The chuck 3 is mounted on a drill spindle 4 of the unit 2 for rotation about an axis 28 on which the spindle 4 is centered. The chuck 3 is centered on an axis 6 normally coaxial with the spindle axis 28 and has a body 5 formed with three angled guides 7 each holding a respective slidable jaw 8 having a toothed rear edge 9 meshing with an internal screwthread of a tightening ring 10. A tightening sleeve 11 is connected via a coupling sleeve 12 to the ring 10 and a locking mechanism 13 is provided for preventing unwanted rotation of the ring 10 relative to the body 5. Rotation of the sleeve 13 with the ring 10 in one direction about the axis 6 moves the jaws 8 axially forward (down in FIGS. 1 and 2) and together to grip a tool or workpiece and opposite rotation spreads them to dechuck the tool or workpiece. This is all generally standard and well known in the art.

In accordance with the invention the chuck body 5 has an axially centered and rearwardly projecting shaft or stem 14 which is at least partially of nonround, here hexagonal, section and that fits into an axially forwardly open blind bore or socket 15 of complementary shape and section formed at a front end of the spindle 4. Thus when the stem 14 is fitted to the socket 15, the body 5 is rotationally locked to the shaft 4.

The stem 14 is formed with a radially outwardly open recess or groove 16 into which can engage a plurality of locking elements or balls 18 received in respective radial passages 17 formed in the end of the spindle 4. The wall thickness of this end of the spindle 4 is smaller than the diameter of the balls 18 so that they must project either radially outward or inward from the respective passages 17 which therefore are shorter than the diameters of the balls 18.

The spindle 4 is surrounded by an axially slidable locking collar 19 formed with a radially inwardly open recess or groove 22 that can be moved into a position axially level with the balls 18, but otherwise a cylindrical inner surface of this collar 19 lies snugly against a cylindrical outer surface 29 of the end of the spindle 4 and normally forces the balls 18 to project radially inward from the inner surface of the bore 15. A spring 21 braced axially between a forwardly directed shoulder 20 of the spindle 4 and a rearwardly directed shoulder 24 of the collar 19 urges the collar 19 forward into a locked position with the groove 22 offset axially forward and the balls 18 projecting into the bore 15. A thin-wall sheet-metal sleeve 27 carried on the rear end of the chuck body 5 is also urged axially forward by a spring 38 and can bear axially rearward on the collar 19 which has an outside formation 23 adapted to be grasped by the fingers of the user of the tool.

Thus in the locked position of FIG. 1 the balls 18 engage in the groove 16 and fix the chuck 3 axially to the spindle 4. Pulling the collar 19 back, either directly or by pulling back the sleeve 27, into an unillustrated unlocked position allows the balls 18 to move radially outward and free the stem 14, which can then be pulled axially forward off the spindle 4 as shown in FIG. 2. To fit the chuck 3 back onto the spindle 4, the collar 19 is retracted to allow the balls 18 to move radially outward, the stem 14 is fitted back into the bore 15, and the collar 19 is released to fix it in place. The flanks of the groove 22 are angled at about 45° to the axis 28 so that they can cam the balls 18 inward and do not catch on them.

The chuck body 5 is formed with a rearwardly open annular seat having a cylindrical inner wall 30 that can fit snugly with the cylindrical outer wall 29 of the end of the spindle 4 and that is formed by a rearwardly projecting and axially centered collar 31 formed on the body 5. The spindle 4 and chuck body 5 have axially flatly engageable and planar annular surfaces 32 that allow substantial axial pressure to be transmitted from the chuck body 5 back to the spindle 4, while the interfitting surfaces 29 and 30 keep these two parts perfectly centered on each other and maintain the axes 6 and 28 coaxial.

Figure 3:
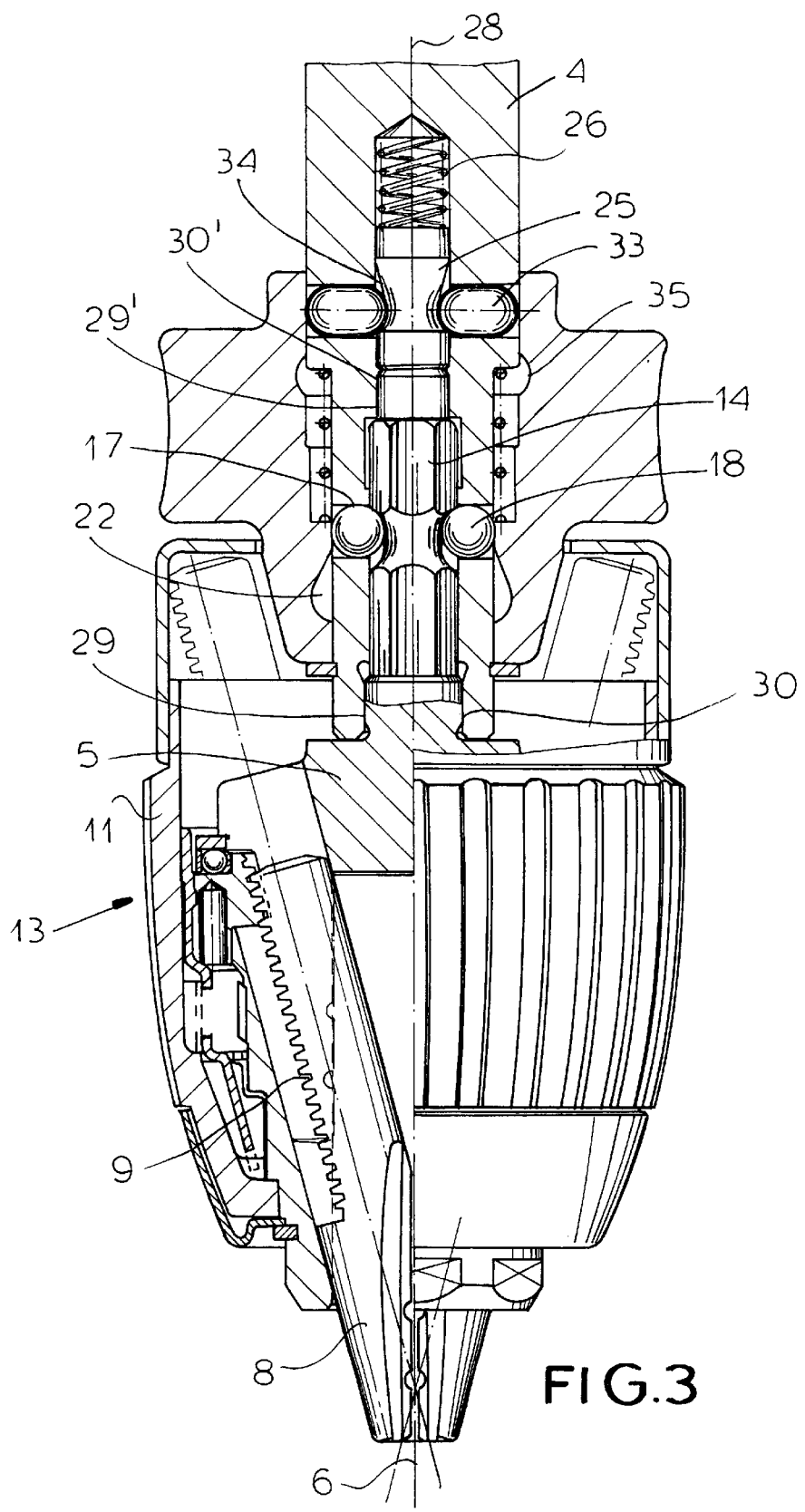
FIGS. 3 and 4 are views like FIGS. 1 and 2 of a second chuck in accordance with the invention.
Figure 4:
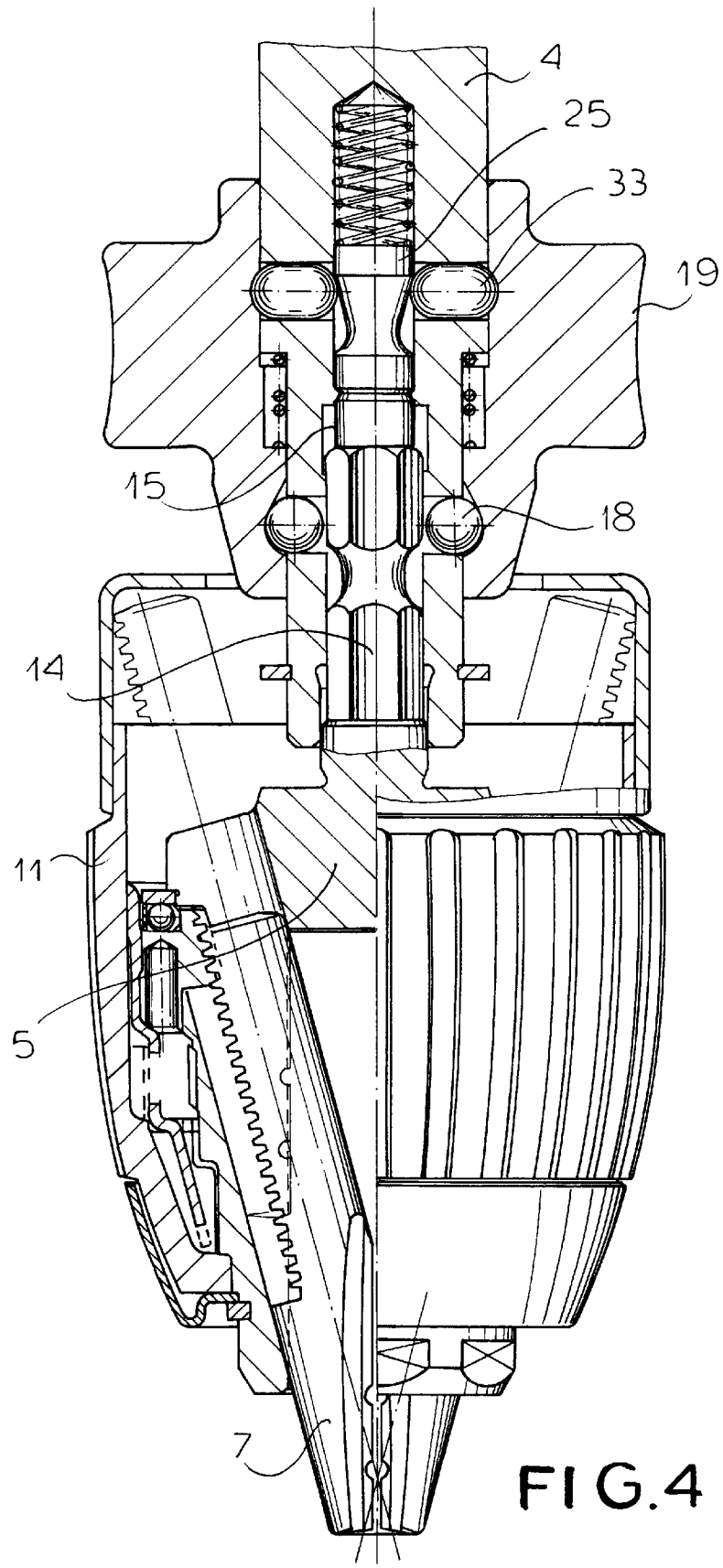

In the arrangement of FIGS. 3 and 4 the spindle 4 holds an axially displaceable knockout rod 25 urged axially forward by a spring 26 into engagement with the rear end of the stem 14 which here is shown having at its rearmost end a cylindrical surface 29' slidable in a cylindrical surface 30' at the rear end of the bore 15. A radially outwardly open recess or groove 34 on the knockout rod 25 can receive inner ends of radially displaceable locking elements 33 that can also engage, like the balls 18, in a radially inwardly open groove or recess 35 of the collar 19. Thus, when the collar 19 is in the front locking position shown in FIG. 3, the elements 18 and 33 are pressed radially inward to lock the stem 14 in place as described above and to lock the knockout rod 25 in a rear position. When the collar 19 is moved into the rear unlocking position shown in FIG. 4, the stem 14 is first freed by the balls 18 as described above and then the knockout rod 25 is similarly freed to press axially forward with the force of the spring 26 on the rear end of the stem 14, urging the chuck 3 off the spindle 4.

Figure 5:
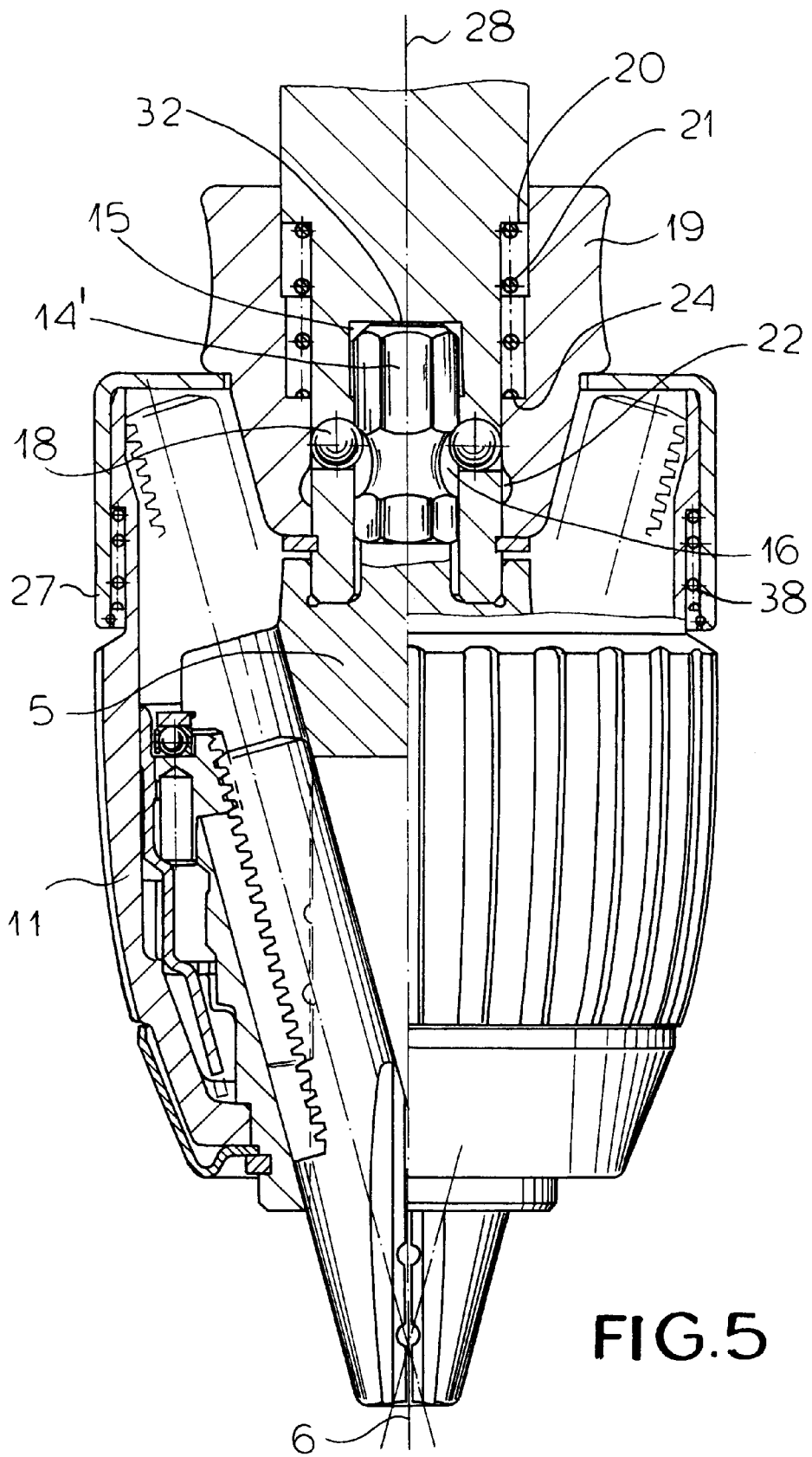
FIGS. 5 and 6 are views like FIG. 1 of third and fourth chucks according to the invention.

In FIG. 5 the stem 14' is not unitary with the chuck body 5, but instead is a separate piece screwed centrally from the rear into the body 5. In addition the surfaces 32 are formed by the end of the stem 14 and the floor of the socket 15. Otherwise this system is identical to that of FIGS. 1 and 2.

Figure 6:
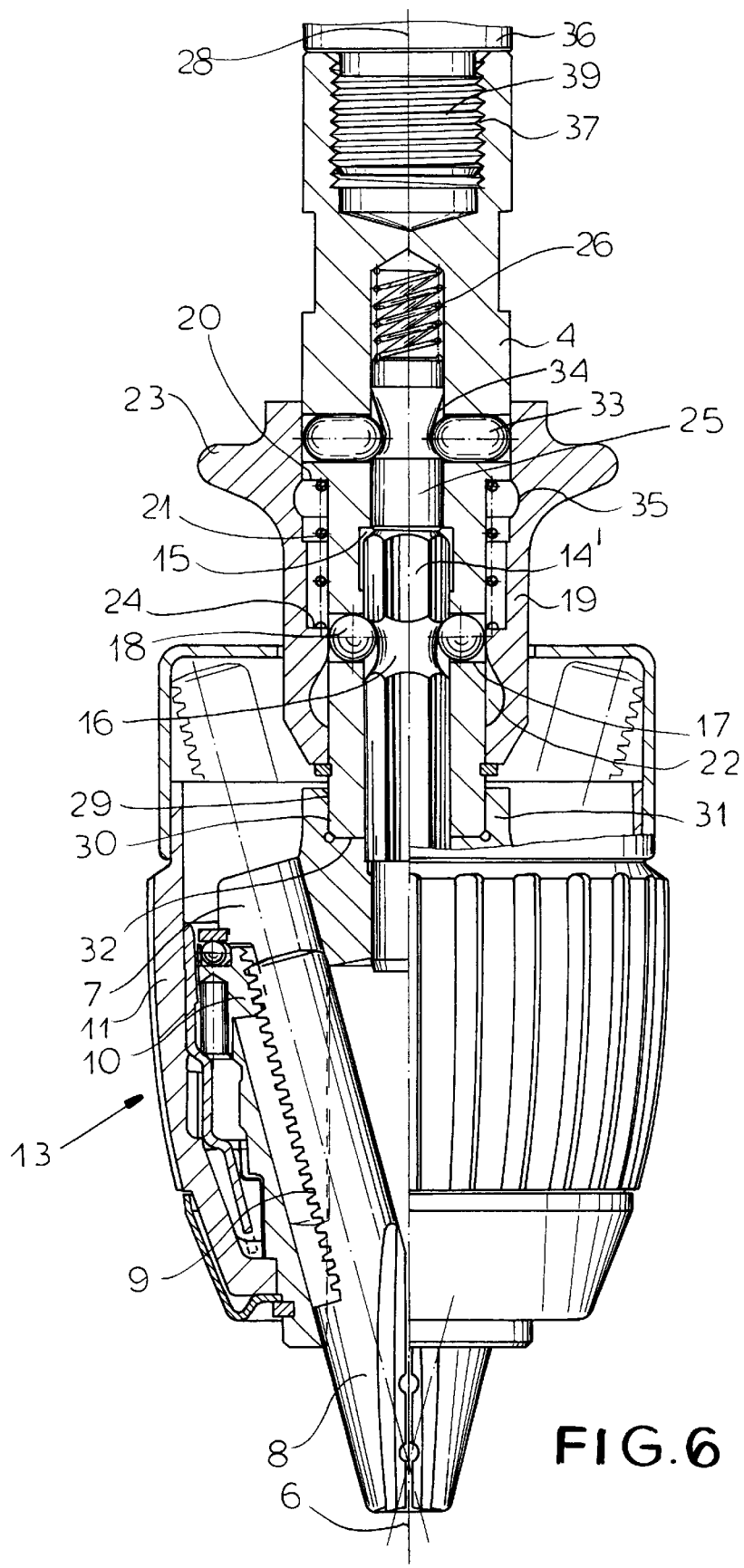

FIG. 6 shows an arrangement where the spindle 4 is formed with a rearwardly open seat 37 that is fitted to a threaded front end 39 of a drill spindle 36. Thus this system can be adapted to a standard threaded-spindle drill unit. Here also the finger formation 23 is formed as a radially outwardly projecting ridge, not as a radially outwardly open shallow groove as in FIGS. 1 through 5. The spindle part 4' is also separate from joined to the stem 36 of the drive unit somewhat as in FIG. 5. Similarly the stem 14' is integrally joined to but not unitary with the chuck body 5.

Figure 7:
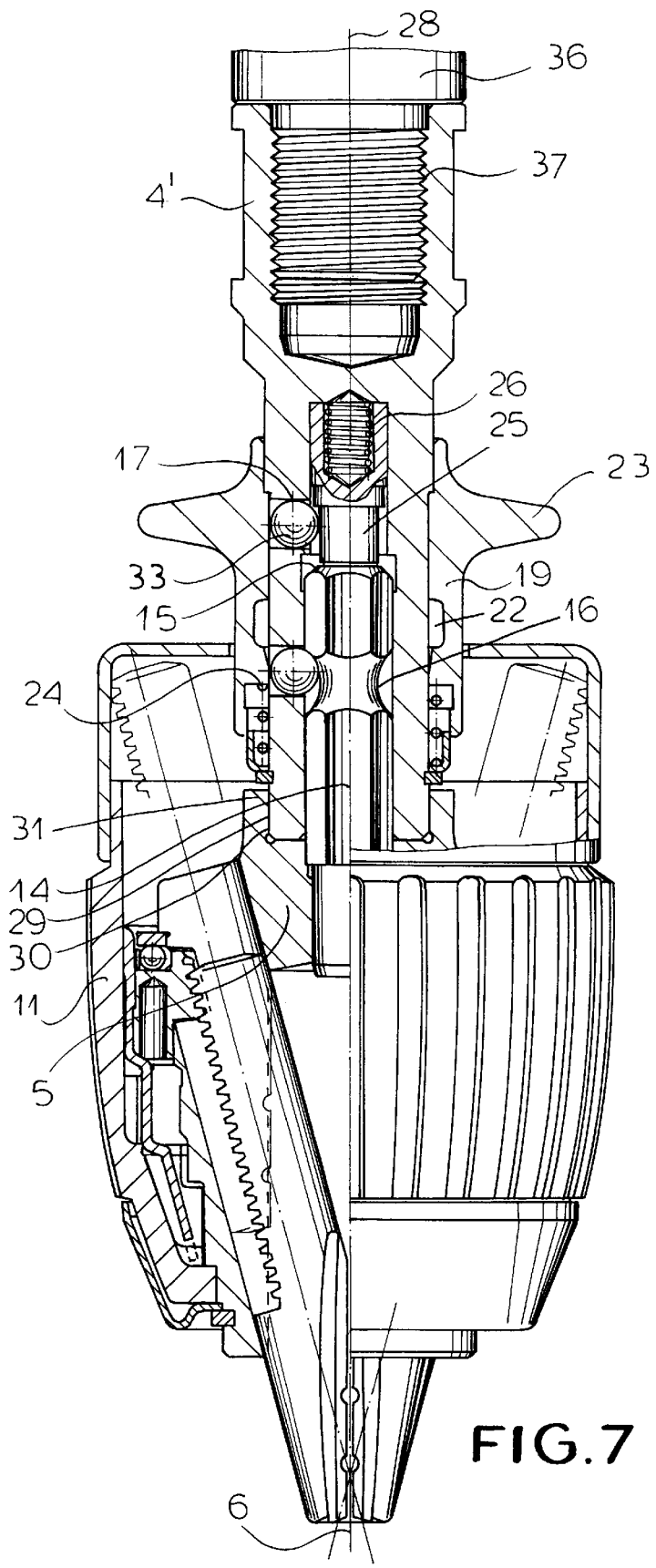
FIGS. 7 and 8 are views like FIGS. 1 and 2 of a fifth chuck in accordance with the invention.
Figure 8:
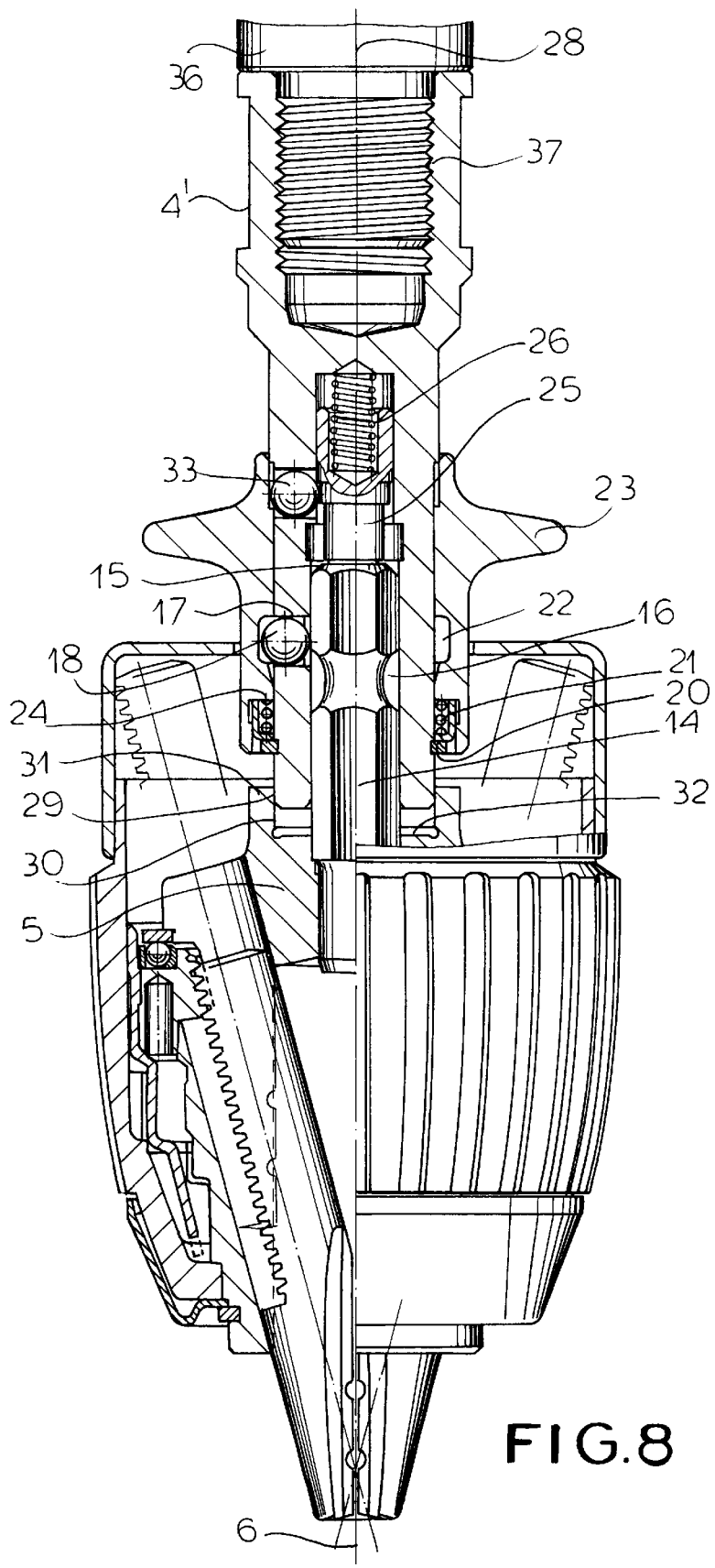

The system of FIGS. 7 and 8 is a hybrid of the systems of FIGS. 1 through 6, with a knockout rod 25 and a separate spindle part 4'.

I claim:

1. A drill comprising:
   a drive spindle centered on and rotatable about a spindle axis and formed centered on the spindle axis with
      an axially forwardly open socket of noncircular section,
      at least one radially throughgoing passage open radially inward into the socket,
      a radially directed rotation-symmetrical surface portion, and
      an axially directed planar face perpendicular to the spindle axis;
   a chuck body formed with a radially directed rotation-symmetrical surface portion complementary to the radially directed surface portion of the spindle and with an axially directed planar face perpendicular to a stem axis;
   a stem of noncircular section complementary to that of the socket, fixed to the chuck body, extending along the stem axis from the chuck body, and formed with a radially outwardly open recess, the stem being fittable in the socket with the radially directed surface portions snugly radially engaging each other and the faces bearing axially flatly on each other;
   a locking element radially displaceable in the passage between an inner position projecting radially inward into the socket and an outer position clear of the socket and projecting radially outward from the spindle, the recess being aligned with the passage when the stem is fitted to the socket with the faces bearing axially on each other; and
   a collar formed with an inner surface closely juxtaposed with an outside surface of the spindle and with a radially inwardly open recess, the collar being axially displaceable on the spindle between a locked position with its inner surface pressing the element into the inner position and an unlocked position with its recess level with the element and the element movable into the outer position engaged in the collar recess.

2. The drill defined in claim 1 wherein the chuck-body surface portion is a cylindrical inner surface centered on the stem axis and the spindle surface portion is a cylindrical outer surface centered on the spindle axis.

3. The drill defined in claim 1 wherein the socket surface portion is a cylindrical inner surface centered on the spindle axis and the stem surface portion is a cylindrical outer surface centered on the stem axis.

4. The drill defined in claim 1 wherein the spindle has an outer end formed with the respective planar face.

5. The drill defined in claim 1 wherein the stem has an outer end formed with the respective planar face and the socket has a floor formed with the planar face of the spindle.

6. The drill defined in claim 1 wherein the stem and socket are of polygonal section.

7. The drill defined in claim 1 wherein the spindle is formed with a plurality of the passages each receiving a respective one of the locking elements, the recess of the stem being a radially outwardly open groove.

8. The drill defined in claim 7 wherein the locking elements are balls.

9. The drill defined in claim 1, further comprising
   a spring braced between the spindle and the collar urging the collar into the locked position.

10. The drill defined in claim 1 wherein the body is formed with a plurality of angled axially forwardly open guides, the drill further comprising:
    respective jaws displaceable in the jaws; and
    a tightening ring rotatable on the body and having a screwthread meshing with the jaws.

11. The drill defined in claim 1, further comprising:
    a knockout rod axially displaceable in the spindle and axially engageable with the stem; and
    a spring urging the knockout rod outward against the stem.

12. The drill defined in claim 11, further comprising:
    a second locking element radially engageable with the knockout rod and with the collar, the second locking element being movable out of engagement with the knockout rod on displacement of the collar into the unlocked position.

13. The drill defined in claim 12 wherein the spindle is formed with a second radially extending passage level with the knockout rod and holding the second locking element, the knockout rod being formed with a radially outwardly open recess in which the second element is radially engageable in the locked position of the collar.

14. The drill defined in claim 1 wherein the spindle has an outer part forming the socket and an inner part, the outer and inner parts being threaded together.

15. A drill comprising:
    a drive spindle centered on and rotatable about a spindle axis and formed centered on the spindle axis with an axially forwardly open socket of noncircular section and with at least one radially throughgoing passage open radially inward into the socket;
    a chuck body;
    a stem of noncircular section complementary to that of the socket, fixed to the chuck body, and extending along a stem axis from the chuck body, the stem being formed with a radially outwardly open recess;
    a locking element radially displaceable in the passage between an inner position projecting radially inward into the socket and an outer position clear of the socket and projecting radially outward from the spindle, the stem being fittable to the socket with its recess aligned with the passage;
    a collar formed with an inner surface closely juxtaposed with an outside surface of the spindle and with a radially inwardly open recess, the collar being axially displaceable on the spindle between a locked position with its inner surface pressing the element into the inner position and an unlocked position with its recess level with the element and the element movable into the outer position engaged in the collar recess;
    a sleeve axially displaceable on the chuck body and axially engageable with the collar; and
    a spring braced between the sleeve and the chuck body and urging the sleeve axially away from the collar.

* * * * *